(12) United States Patent
Kadiwala et al.

(10) Patent No.: US 11,455,622 B2
(45) Date of Patent: Sep. 27, 2022

(54) COMPUTER SYSTEM AND COMPUTER-IMPLEMENTED METHOD FOR AUTHENTICATING A CONTACTLESS PAYMENT TRANSACTION

(71) Applicant: MASTERCARD INTERNATIONAL INCORPORATED, Purchase, NY (US)

(72) Inventors: Asif Shaukat Kadiwala, Vadodara (IN); Gaurav Anilkumar Dayal, Vadodara (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 325 days.

(21) Appl. No.: 15/815,907

(22) Filed: Nov. 17, 2017

(65) Prior Publication Data
US 2019/0139029 A1   May 9, 2019

(30) Foreign Application Priority Data
Nov. 9, 2017   (SG) .............................. 10201709243P

(51) Int. Cl.
*G06Q 20/36*   (2012.01)
*G06Q 20/10*   (2012.01)
(Continued)

(52) U.S. Cl.
CPC ....... *G06Q 20/3674* (2013.01); *G06Q 20/102* (2013.01); *G06Q 20/322* (2013.01);
(Continued)

(58) Field of Classification Search
None
See application file for complete search history.

(56) References Cited

U.S. PATENT DOCUMENTS 6,819,219 B1 * 11/2004 Bolle ............... G06Q 20/40145
340/5.82
8,554,689 B2   10/2013 Mardikar et al.
(Continued)

FOREIGN PATENT DOCUMENTS

WO   WO-2019063852 A1 *   4/2019

OTHER PUBLICATIONS

Michalow, Michelle J., "Analysis of the Impact of Technological Advances on Financial Institutions", Utica College, May 2016. (Year: 2016).*

*Primary Examiner* — Neha Patel
*Assistant Examiner* — Clay C Lee
(74) *Attorney, Agent, or Firm* — Harness, Dickey & Pierce, P.L.C.

(57) ABSTRACT

An application system for authenticating a contactless payment transaction is described, the application system comprising: (i) a verification module configured to receive, from an operating system, a cipher if a customer is authenticated; and (ii) an access module configured to: (a) instruct the operating system to use the cipher to decrypt a transaction personal identification number (PIN) which is stored in a
(Continued)

local database in an encrypted form; (b) receive the transaction PIN once decrypted; and (c) use the transaction PIN to access a token, the token being associated with payment details for processing the payment transaction.

15 Claims, 12 Drawing Sheets

(51) Int. Cl.
*G06Q 20/32* (2012.01)
*H04L 9/30* (2006.01)
*G06Q 20/40* (2012.01)
*G06Q 30/06* (2012.01)
*G06Q 20/38* (2012.01)
*G06Q 20/34* (2012.01)

(52) U.S. Cl.
CPC ..... *G06Q 20/352* (2013.01); *G06Q 20/38215* (2013.01); *G06Q 20/4012* (2013.01); *G06Q 20/40145* (2013.01); *G06Q 30/06* (2013.01); *H04L 9/30* (2013.01)

(56) References Cited

U.S. PATENT DOCUMENTS

| | | | |
|---|---|---|---|
| 8,683,232 B2* | 3/2014 | Yuen | G06F 21/31 713/193 |
| 8,996,886 B2* | 3/2015 | Baughman | G06F 21/6245 713/193 |
| 9,785,940 B2* | 10/2017 | deOliveira | G06Q 20/4015 |
| 2003/0149662 A1* | 8/2003 | Shore | G06Q 20/32 705/39 |
| 2006/0229988 A1 | 10/2006 | Oshima et al. | |
| 2008/0301057 A1* | 12/2008 | Oren | H04L 63/0428 705/71 |
| 2012/0030121 A1 | 2/2012 | Grellier | |
| 2013/0046697 A1* | 2/2013 | Schibuk | G06Q 20/385 705/67 |
| 2015/0046340 A1* | 2/2015 | Dimmick | H04L 63/104 705/72 |
| 2015/0213435 A1* | 7/2015 | Douglas | G06Q 20/322 705/64 |
| 2016/0104154 A1 | 4/2016 | Milov et al. | |
| 2016/0307186 A1 | 10/2016 | Noë et al. | |
| 2016/0323264 A1* | 11/2016 | Nayshtut | H04L 63/0823 |
| 2017/0270523 A1* | 9/2017 | Choi | G06Q 20/3278 |

* cited by examiner

| API Response (Call-back) | Response Code and Scenarios | App behaviour | User Experience (UX) |
|---|---|---|---|
| onAuthenticationSucceeded | (No response code generated) | 1. Authentication is successful and continue with the operation – App Launch, Single Tap, Double Tap or In-App checkout.<br>2. Retreive CryptoObject from FingerprintManager.AuthenticationResult.<br>3. Fetch Cipher instance from CryptoObject and retreive encrypted/decrypted transaction PIN. | Success Message: "Fingerprint recognised" |
| onAuthenticationOnHelp | FINGERPRINT_ACQUIRED_GOOD - The image acquired was good. | Fingerprint image acquired but not processed.<br>https://android.googlesource.com/platform/frameworks/base/+/9f0753f/core/java/android/service/fingerprint/FingerprintManager.java | Failure Message: "Fingerprint not recognised. Try again." |
| | FINGERPRINT_ACQUIRED_IMAGE_DIRTY - The fingerprint image was too noisy due to suspected or detected dirt on the sensor. | Display Appropriate error message to user and allow user to retry | Failure Message: "Fingerprint not recognised. Try again." |
| | FINGERPRINT_ACQUIRED_INSUFFICIENT - The fingerprint image was too noisy to process due to a detected condition. | | |
| | FINGERPRINT_ACQUIRED_PARTIAL - Only a partial fingerprint image was detected. | | |
| | FINGERPRINT_ACQUIRED_TOO_FAST - The fingerprint image was incomplete due to quick motion. | | |
| | FINGERPRINT_ACQUIRED_TOO_SLOW - The fingerprint image was unreadable due to lack of motion. | | |

Fig. 8a

| API Response (Call-back) | Response Code and Scenarios | App behaviour | User Experience (UX) |
|---|---|---|---|
| onAuthenticationError | FINGERPRINT_ERROR_CANCELED - The operation was cancelled because the fingerprint sensor is unavailable. | This call-back is received when, 1. User presses "Power" key of the system and turns off the screen. 2. Another application comes onto the foreground and request for fingerprint sensor. Action: This is a notification from Android™ platform and No action is required on this error. | |
| | FINGERPRINT_ERROR_HW_UNAVAILABLE - The hardware is unavailable. | Refer *FINGERPRINT_ERROR_LOCKOUT* | |
| | FINGERPRINT_ERROR_LOCKOUT - The operation was cancelled because the application programming interface (API) is locked out due to too many attempts. | • Android™ app to opt-out from Fingerprint based authentication on receiving "Lockout" Error code from Android™ platform. Clear all the keys and encrypted data attached from Android™ device and fallback to standard personal identification number (PIN) | |
| | FINGERPRINT_ERROR_NO_SPACE - Error state returned for operations like enrollment; the operation cannot be completed because there's not enough storage remaining to complete the operation. | These are edge cases, display error message as described in User Experience (UX) column. | Failure Message: "System memory full. Close other apps and try again" |
| | FINGERPRINT_ERROR_TIMEOUT - Error state returned when the current request has been running too long. | | Failure Message: "Fingerprint not recognised. Try again." |
| | FINGERPRINT_ERROR_UNABLE_TO_PROCESS - Error state returned when the sensor was unable to process the current image. | | Failure Message: "Fingerprint not recognised. Try again." |
| onAuthenticationFailed | (No response code generated) | Error Scenario | Failure Message: "Fingerprint not recognised. Try again. |

Fig. 8b

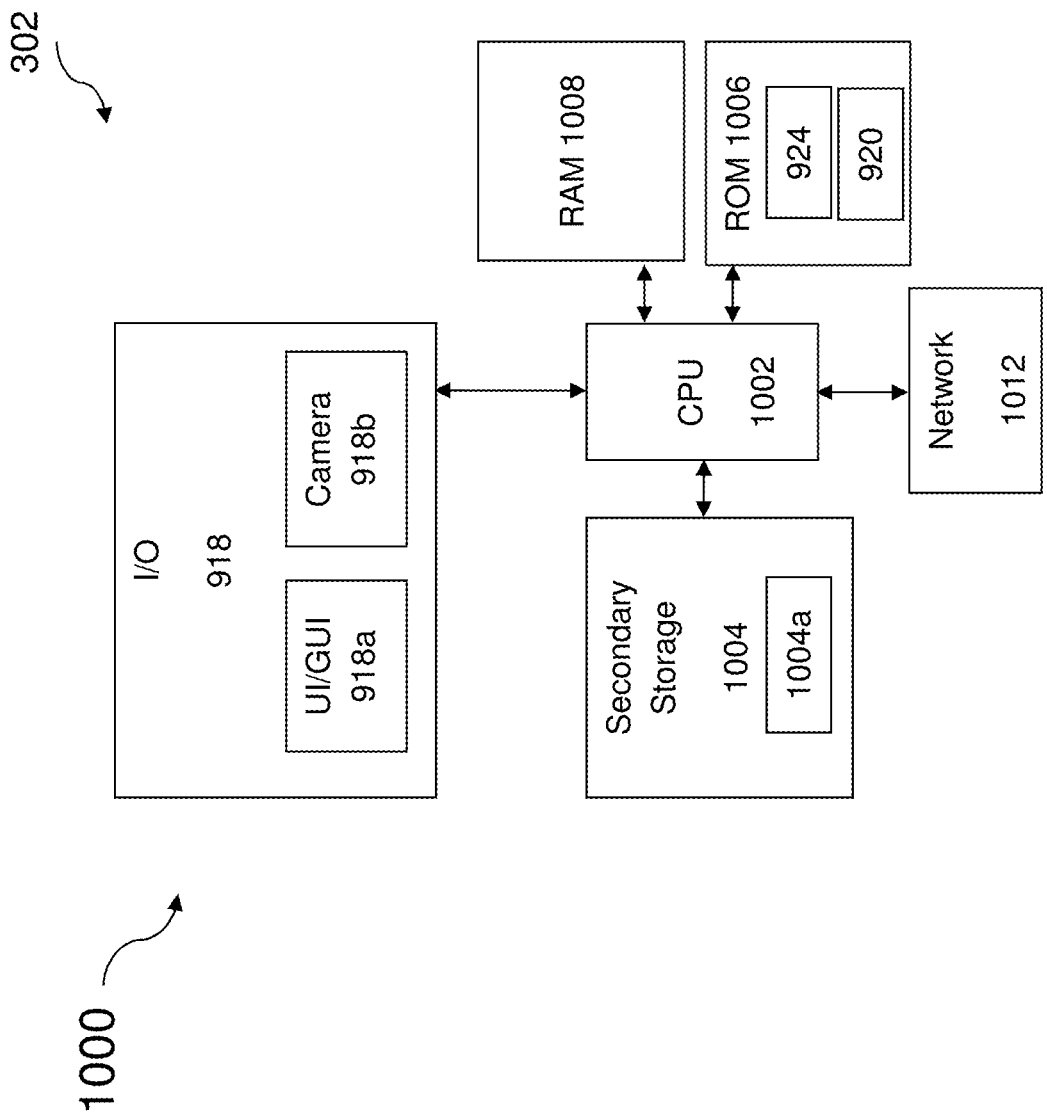

COMPUTER SYSTEM AND COMPUTER-IMPLEMENTED METHOD FOR AUTHENTICATING A CONTACTLESS PAYMENT TRANSACTION

CROSS-REFERENCE TO RELATED APPLICATION

This application claims the benefit of and priority to Singapore Patent Application No. 10201709243P filed Nov. 9, 2017. The entire disclosure of the above application is incorporated herein by reference.

FIELD

The present disclosure relates to a computer system and computer-implemented method for authenticating a contactless payment transaction. In particular, the disclosure relates to authenticating a contactless payment transaction locally (i.e., at a Point of Sale (POS) terminal) or offline.

BACKGROUND

This section provides background information related to the present disclosure which is not necessarily prior art.

Authentication of transactions using a payment card or a payment account is a typical step in completing a transaction process. Conventionally, a holder of the payment card or the payment account is required to provide a personal identification number (PIN) as part of an authentication process to verify his/her identity and ownership of the payment card or payment account before the transaction can proceed.

Nonetheless, there are several problems with currently existing solutions, as discussed now. Firstly, a PIN cannot be stored on any customer mobile device without hardware-backed secured storage as it is not permitted under current information security standards (e.g., Payment Card Industry's Data Security Standard (PCI DSS) or Compatibility Definition Document). Secondly, authenticating a transaction often requires a communication channel to be available (e.g., an internet connection) between a customer mobile device, a merchant device and a backend server which causes inconvenience to customers when such connection is not available. Thirdly, even if such a communication channel is available, communication between the customer mobile device, the merchant device and the backend server to authenticate the transaction often results in significant latency, thereby increasing transaction processing time leading to a poor customer experience.

It is therefore an aim of the present disclosure to provide a computer system and computer-implemented method to ameliorate some or all of the aforementioned problems.

SUMMARY

This section provides a general summary of the disclosure, and is not a comprehensive disclosure of its full scope or all of its features. Aspects and embodiments of the disclosure are set out in the accompanying claims.

In accordance with a first aspect of the present disclosure, there is provided an application system for authenticating a contactless payment transaction. The system comprises a verification module configured to receive, from an operating system, a cipher if the customer is authenticated. The system also comprises an access module configured to: instruct the operating system to use the cipher to decrypt a transaction personal identification number (PIN) which is stored in the local database in an encrypted form; receive the transaction PIN once decrypted; and use the transaction PIN to access a token, the token being associated with payment details for processing the payment transaction.

Embodiments of the disclosure therefore provide an application system for authenticating a contactless payment transaction. The application system may comprise software or hardware, or a combination thereof. For example, the application system may be constituted by an application (e.g., a mobile application or App) for an electronic device to carry out embodiments of the disclosure.

In particular, the application system stores a transaction personal identification number (PIN) in an encrypted form in a local database which is required to access a token for processing the contactless payment transaction. The PIN may be a string of numerals, alpha-numeric or symbols with varying lengths and in any combinations. To access the token, the customer is authenticated prior to accessing the application system (App) running on a customer electronic device. The customer may be authenticated by an operating system of the customer electronic device (e.g., using a fingerprint manager or other confirm credentials application programming interface (API)). Once the customer is authenticated, the App is configured to receive, from the operating system, a cipher which is used to decrypt the encrypted transaction PIN. The transaction PIN, once decrypted, is then used to access the token for processing the contactless payment transaction. In this way, the application system of the present disclosure is configured to authenticate a contactless payment transaction offline, advantageously overcoming a need to communicate with any server for authenticating the contactless payment transaction. Moreover, this advantageously avoids latency or time lag often encountered in authenticating contactless payment transactions, thereby providing a better customer experience.

In addition, embodiments of the disclosure may advantageously use existing infrastructure for authenticating contactless card transactions so that minimal costs will be incurred to implement the above. The primary set-up required is to maintain registration records of relevant customers and/or systems registered to authenticate contactless payment transactions offline at an account server (e.g., an electronic wallet service provider server or a payment network server) which can be easily implemented using existing memory storages, servers and/or databases.

The application system may comprise a registration module configured to: receive a registration request from the customer, where the registration request is a request to register the system for use in authenticating the payment transaction; and instruct the operating system to generate a key. The application system may then further comprise a communication module, where the communication module is configured to: transmit a result of the registration request to an account server, the account server being associated with a payment account used in the payment transaction; and receive a code from the account server, the code being associated with authenticating the payment transaction.

In this way, the customer and/or the application system is registered with the account server once and he/she can subsequently authenticate contactless payment transactions using the payment account (e.g., an electronic wallet) using the system offline.

In an embodiment where the key is a symmetric key and the code received from the account server is the transaction PIN, the registration module may be further configured to instruct the operating system to: derive the cipher using the symmetric key; encrypt the transaction PIN using the cipher; and store the transaction PIN in encrypted form in the local database.

In an embodiment where the key is an asymmetric key pair and the asymmetric key pair comprises a private key and a public key, the public key is used by the account server to encrypt the transaction PIN such that the code received from the account server is the transaction PIN in encrypted form. In connection therewith, the communication module may be further configured to transmit the public key to the account server, and the registration module may be further configured to store the transaction PIN in encrypted form in the local database.

The verification module of the system may be configured to: prompt a customer for a customer identifier input for authentication when the system is initialised; and prompt the operating system to receive the customer identifier input from the customer.

The verification module of the system may be configured to instruct the operating system to prompt the customer for a customer identifier input for authentication.

In accordance with a second aspect of the present disclosure, there is provided a computer-implemented method for authenticating a contactless payment transaction, where the method comprises: receiving, from an operating system, a cipher if a customer is authenticated; instructing the operating system to use the cipher to decrypt a transaction personal identification number (PIN) which is stored in a local database in an encrypted form; receiving the transaction PIN once decrypted; and using the transaction PIN once decrypted to access a token, the token being associated with payment details for processing the payment transaction.

The method may further comprise: receiving a registration request from the customer, the registration request being a request to register the application system for use in authenticating the payment transaction; instructing the operating system to generate a key; instructing the operating system to authenticate the customer to verify the registration request; transmitting a result of the registration request to an account server, the account server being associated with a payment account used in the payment transaction; and receiving a code from the account server, the code being associated with authenticating the payment transaction.

In an embodiment, where the key is a symmetric key and the code is received from the account server is the transaction PIN, the method may comprise instructing the operating system to: derive the cipher using the symmetric key; encrypt the transaction PIN using the cipher; and store the transaction PIN in encrypted form in the local database.

In an embodiment, where the key is an asymmetric key pair and the asymmetric key pair comprises a private key and a public key, and where the public key is used by the account server to encrypt the transaction PIN such that the code received from the account server is the transaction PIN in encrypted form, the method may further comprise: transmitting the public key to the account server; and storing the transaction PIN in encrypted form in the local database.

In some embodiments where the key is a symmetric key, the operating system initialises the cipher using the symmetric key if the customer identifier input matches the customer identifier. The customer identifier may be stored locally in an encrypted form.

In some embodiments where the key is an asymmetric key pair, the operating system initialises the cipher using the private key of the asymmetric key pair if the customer identifier input matches the customer identifier.

The method may comprise the account server salting the transaction PIN if the transaction PIN is determined by the customer.

In some embodiments, the transaction PIN is randomly generated by the account server.

The method may comprise determining if the application system is eligible to register for authenticating the payment transaction and the application system is eligible if at least one customer identifier is stored in the local database.

The key may be stored in a trusted execution environment (TEE) of the operating system.

The customer identifier input may be selected from one of the following: a biometric, a fingerprint, a facial recognition, an iris recognition, a voice recognition, a gesture, or a password.

In accordance with a third aspect of the present disclosure, there is provided a computerised network for authenticating a contactless payment transaction, where the computerised network comprises an application system comprising a registration module configured to: receive a registration request from a customer, the registration request being a request to register the application system for use in authenticating the payment transaction; and instruct an operating system to generate a key. The application system also comprises a verification module configured to instruct the operating system to authenticate the customer to verify the registration request; and a communication module configured to transmit a result of the registration and receive a code being associated with authenticating the payment transaction. In connection therewith, the application system is registered and the verification module is further configured to receive, from the operating system, a cipher if the customer is authenticated. The application system further comprises an access module, where the access module is configured to: instruct the operating system to use the cipher to decrypt a transaction personal identification number (PIN) which is stored in the local database in an encrypted form; receive the transaction PIN once decrypted; and use the transaction PIN to access a token, the token being associated with payment details for processing the payment transaction. The application system still further comprises an account server associated with a payment account used in the payment transaction, wherein the account server comprises a server communication module configured to: receive the result of the registration; and transmit the code to the application system.

In accordance with a fourth aspect of the present disclosure, a non-transitory computer-readable medium having stored thereon program instructions for causing at least one processor to perform the preceding method.

The present disclosure aims to provide a new and useful computer system and computer-implemented method for authenticating contactless payment transactions.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Non-limiting embodiments of the disclosure will now be described for the sake of example only, with reference to the following drawings in which.

Figure 3:
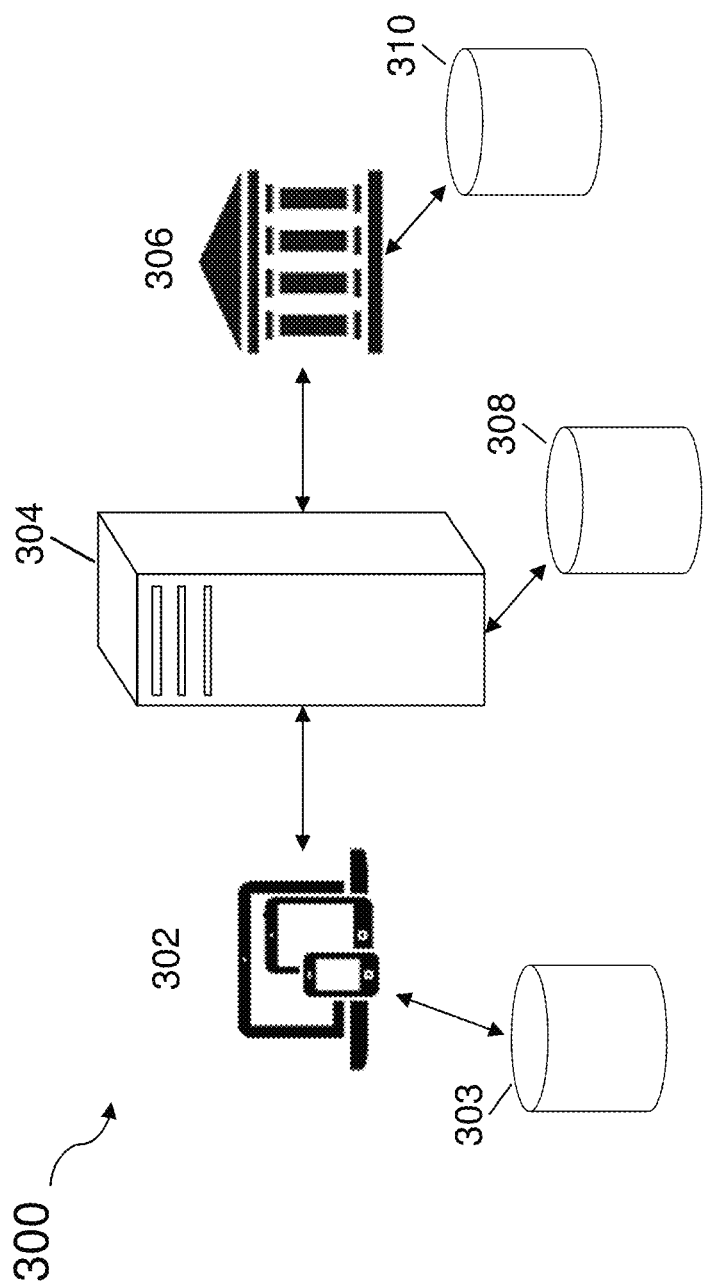
FIG. 3 shows a computerised network for performing the method of FIG. 2 in accordance with an embodiment of the disclosure.
Figure 9A:
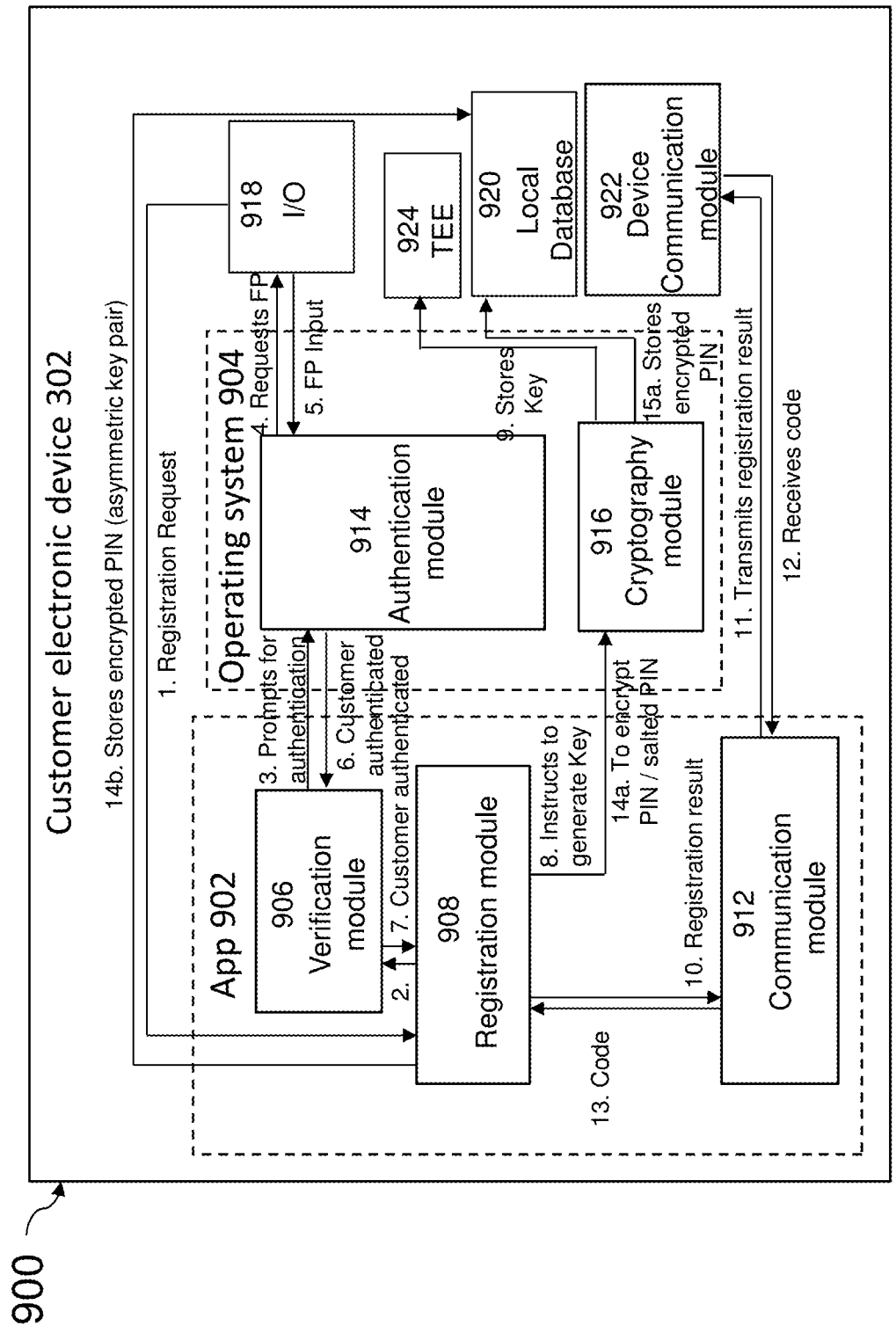
Figure 9B:
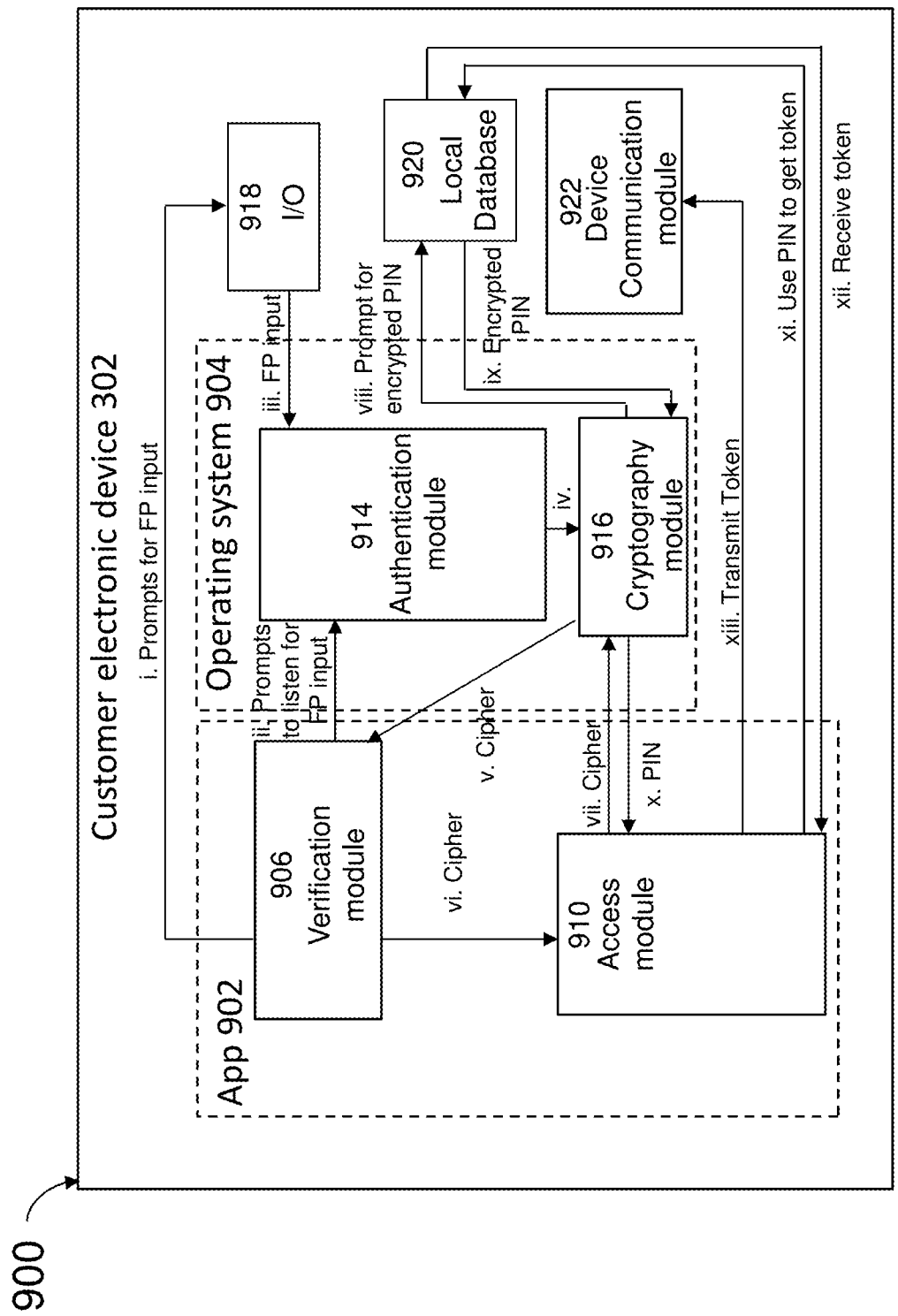
Figure 11:
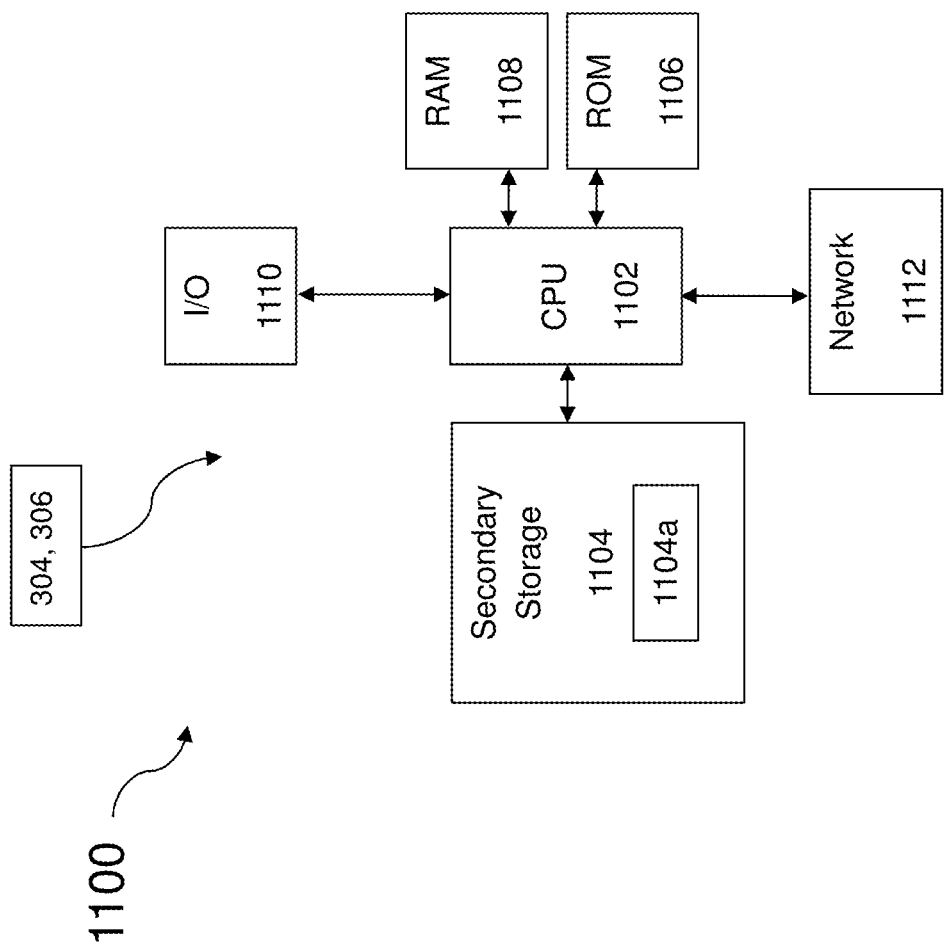

FIG. 8, comprising FIGS. 8a and 8b, shows a non-exhaustive list of responses returned by the system for authenticating contactless payment transactions;

FIG. 9, comprising FIGS. 9a and 9b, shows schematically a functional structure of the customer electronic device (e.g., comprising the application system and the operating system), where FIG. 9a shows a process flow during a registration process while FIG. 9b shows a process flow between different modules in the customer electronic device during an authentication process for a payment transaction, in accordance with various embodiments of the disclosure;

FIG. 10 shows schematically a hardware structure of the system which may be used in the computerised network of FIG. 3 to implement a method in accordance with an embodiment of the disclosure; and FIG. 11 shows schematically a hardware structure of a server which may be used in the computerised network of FIG. 3 to implement a method in accordance with an embodiment of the disclosure.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

As used in this document, the term "contactless payment transaction" refers to any form of payment transaction which does not require a physical form of payment, e.g., cash or a payment card. A "contactless payment transaction" may comprise, for example, an internet payment transaction or any form of card-not-present transaction, or the like. In various embodiments of the present disclosure, a "contactless payment transaction" may be carried out using a mobile electronic device.

The term "payment account" refers to any payment account or an electronic account, such as an electronic wallet, that is maintained with an electronic wallet service provider. The "electronic wallet" may exist as an application-based stored value account associated with an electronic wallet service provider tied in with an issuing institution. A payment account may be associated with a credit card, a debit card, a prepaid card, a charge card, a membership card, a promotional card, a frequent flyer card, an identification card, a prepaid card, a gift card, and/or any other payment device that may hold payment account information, such as mobile phones, smartphones, tablets, personal digital assistants (PDAs), key fobs, transponder devices, near field communication (NFC)-enabled devices, and/or computers.

Note that the term "institution" is used here in a sense which is not necessarily limited to organizations which are legally constituted as banks, since in some jurisdictions other organizations may be permitted to maintain financial accounts, such as payment card accounts. An institution may be one of the following: a bank, a financial technology company, a telecommunication company, a financial institution, or other institution.

The term "cipher" refers to any string of codes which can be used to encrypt and decrypt data. In particular, a cipher in various embodiments of the present disclosure is used to encrypt/decrypt a transaction PIN for use in accessing a token for processing contactless payment transactions.

As used in this application, the terms "component," "module," "system," "apparatus," "interface," or the like, are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component or a module. One or more components/modules may reside within a process and/or thread of execution and a component/module may be localized on one computer and/or distributed between two or more computers.

Furthermore, the claimed subject matter may be implemented as a method, system, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include, but are not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

Figure 1:
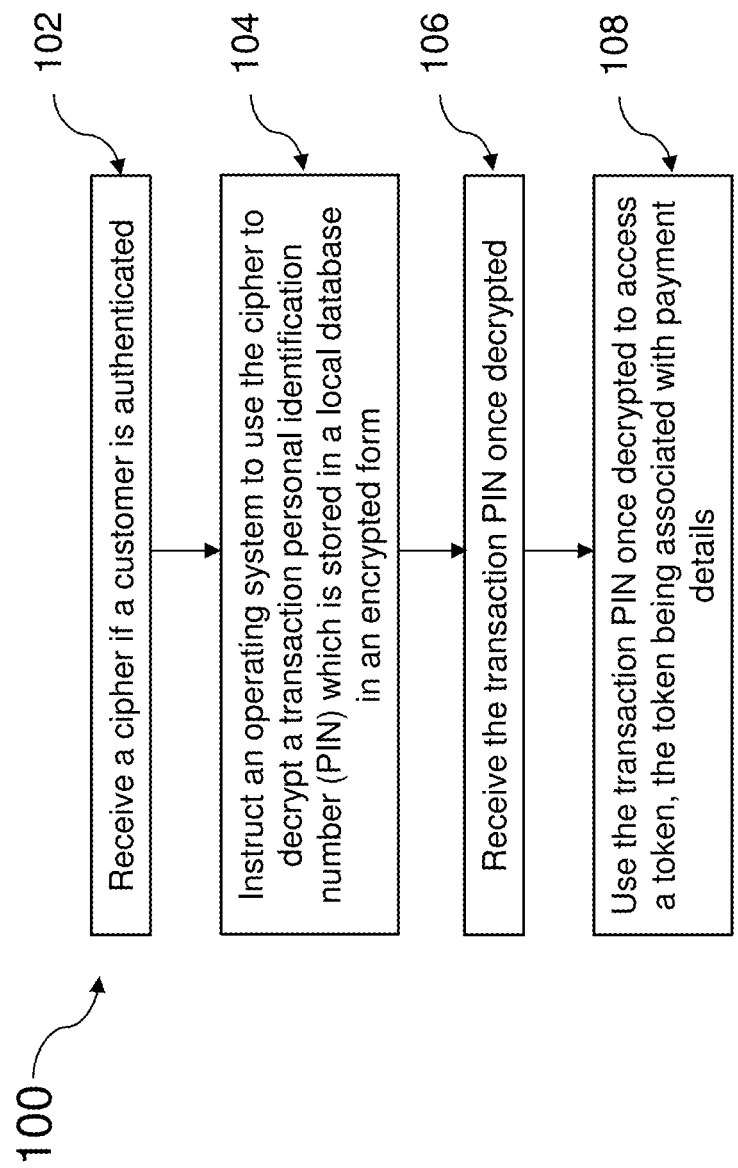
FIG. 1 shows steps of a computer-implemented method which may be performed by a system in accordance with a first embodiment of the disclosure.

FIG. 1 shows a computer-implemented method 100 which may be performed by an application system for authenticating a contactless payment transaction in accordance with a first embodiment of the present disclosure. The application system may comprise software or hardware or a combination thereof. For example, the application system may be a standalone application on the electronic device to carry out embodiments of the disclosure.

In particular, the system of the computer-implemented method 100 is configured to:
a) receive, from an operating system, a cipher if a customer is authenticated in a step 102;
b) instruct the operating system to use the cipher to decrypt a transaction personal identification number (PIN) which is stored in a local database in an encrypted form, in a step 104;

c) receive the transaction PIN once decrypted in a step 106; and d) use the transaction PIN to access a token, the token being associated with payment details for processing the payment transaction, in a step 108.

Prior to receiving the cipher from the operating system of a customer electronic device in the step 102, the customer is required to be authenticated. The customer may be authenticated by a fingerprint manager or a confirm credential application programming interface (API). The fingerprint manager and the confirm credential API reside in the operating system of the customer electronic device. In the scenario where the authentication is carried out by the fingerprint manager, the application system may be configured to prompt the customer for a customer identifier input for authentication when the application system is initialised, and prompt the operating system to receive the customer identifier input from the customer. For the case of a confirm credential API, the application system is configured to receive the cipher from the operating system once the customer is authenticated via the confirm credential API (e.g., when the customer electronic device is reactivated from a lock screen). In some embodiments where the authentication is carried out by either the fingerprint manager or the confirm credential API, the application system may be configured to instruct the operating system to prompt the customer for a customer identifier input for authentication (e.g., during registration of the customer and/or the application system for authenticating contactless payment transactions offline). In any of these cases, to authenticate the customer, the customer is prompted (either by the application system or the operating system (via either the fingerprint manager or the confirm credential API)) to enter a customer identifier input at the customer electronic device and this is received at the operating system. The operating system is configured to authenticate the customer in a conventional manner. This may comprise comparing the customer identifier input received with a registered customer identifier in the local database of the customer electronic device and determining if the customer identifier input matches the registered customer identifier in the local database. The customer may be authenticated if the customer identifier input matches the registered customer identifier. If the customer identifier input does not match the registered customer identifier, the operating system may be configured to notify the customer (either directly or via the application system) that authentication is unsuccessful and request the customer to re-enter the customer identifier input. The customer identifier input may be one of the following: a biometric, a fingerprint, a facial recognition, an iris recognition, a voice recognition, a gesture, or a password. The customer identifier may have been registered with the operating system and stored in a local database of the customer electronic device. The customer electronic device may be a mobile phone, a smart phone, a tablet, a personal digital assistant (PDA), a computer, or the like, which runs an application (App) that allows the customer to authenticate a contactless payment transaction offline. The customer electronic device may be NFC-enabled so that information may be transferred from the customer electronic device contactlessly. In various embodiments, the customer electronic device comprises other forms of communication protocols that allow wireless transfer of data from the customer electronic device to an account server.

Once the customer is authenticated, the cipher may be initialised by a key by the operating system. The key may be a symmetric key or a private key of an asymmetric key pair. The key is generated during registration of the customer and/or the application system for the service of authenticating contactless payment transactions offline, and it is retrieved once the customer is authenticated via the operating system. Details of the different processes used to register the customer and/or the application system to authenticate contactless payment transactions locally/offline is discussed further in relation to FIGS. 4 and 5. In some embodiments, the cipher is used as it advantageously allows encryption or decryption of a large amount of data (e.g., transaction PIN) which may be inefficient otherwise if such data is encrypted or decrypted directly using a key. Moreover, both the cipher and the key are necessary to decrypt the transaction PIN in the present disclosure. This thus provides an additional layer of security to the customers using embodiments of the present disclosure for processing contactless payment transactions.

If the operating system is unable to authenticate the customer, the customer may be prompted to re-enter the customer identifier input or the operation of the application to authenticate the contactless payment transaction may be terminated and the customer may be required to choose another form of payment. Different scenarios leading to an inability to authenticate the customer (e.g., using a fingerprint manager) is further discussed in conjunction with FIGS. 8a and 8b.

In the step 104, after the cipher is received from the operating system, the application system is configured to instruct the operating system to use the cipher to decrypt a transaction personal identification number (PIN) which is stored in the local database in an encrypted form.

Once decrypted, the application system is configured to receive the transaction PIN from the operating system in the step 106.

In the step 108, the application system is configured to use the transaction PIN to access a token associated with payment details for processing the payment transaction.

FIG. 1 thus provides a computer-implemented method 100 which advantageously allows authentication of a contactless payment transaction offline, thereby overcoming a need to communicate with any server for authenticating the contactless payment transaction and advantageously avoids latency or time lag often encountered in authenticating contactless payment transactions.

Moreover, the above method 100 advantageously utilises present infrastructures for authenticating contactless payment transactions so that minimal costs will be incurred to implement the method 100 above. The primary set-up required is to maintain registration records of relevant customers and/or systems registered to authenticate contactless payment transactions offline at an account server (e.g., an electronic wallet service provider server) or a payment network server which can be easily implemented using existing memory storages, servers and/or databases.

Figure 2:
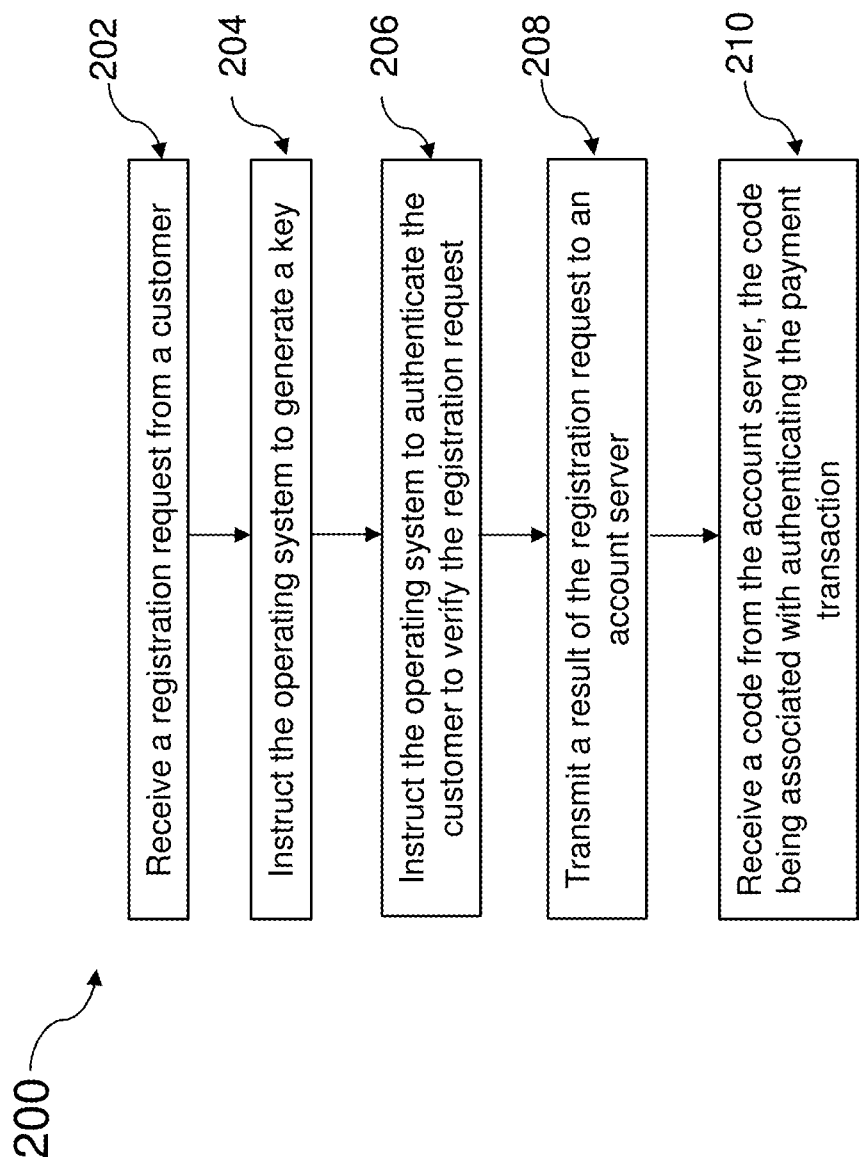
FIG. 2 shows steps of a method for registering the system for use in authenticating contactless payment transactions in accordance with an embodiment of the disclosure.

FIG. 2 shows steps of a method 200 for registering the application system for use in authenticating contactless payment transactions.

In a step 202, the application system receives a registration request from the customer where the registration request comprises a request to register the system for use in authenticating contactless payment transactions. In an embodiment, the customer initiates the registration request by activating the application system and selecting an option to register to use offline authentication for contactless payment transactions on a user interface of the application system.

In a step 204, the application system instructs the operating system to generate a key. The key may be generated using conventional means, for example, by using Android Keystore™ (which is part of the operating system). The key may be a key used for decryption and encryption of data, for example, a transaction PIN in this case. The key may be stored in a trusted execution environment (TEE) of the operating system. The TEE is a secure area of the main processor of the operating system where code and data loaded inside is protected with respect to their integrity and confidentiality. The key may be a symmetric key or an asymmetric key pair. The asymmetric key pair comprises a private key and a public key. In particular, an encryption/decryption algorithm involving the symmetric key uses the same key (e.g., a secret key) for both encryption and decryption processes while that involving the asymmetric key pair typically uses different keys for encryption and decryption (e.g., a public key for encryption and a private key for decryption). In various embodiments, the key may be stored in an Android Keystore™, which can subsequently be retrieved during authentication processes to initialise a cipher for decrypting an encrypted transaction PIN to authenticate a contactless payment transaction, as shown in the method 100 of FIG. 1.

In a step 206, the application system instructs the operating system to authenticate the customer to verify the registration request.

In a step 208, the application system transmits a result of the registration request to an account server, the account server being associated with a payment account or an electronic wallet used in the contactless payment transaction. The account server may also be associated with a payment network server operating in conjunction with an electronic wallet service provider server or an issuer server to administer use of the system for authenticating contactless payment transactions offline. The payment network server is a server associated with a payment network, such as the Banknet payment network operated by Mastercard®. The issuer server is associated with an issuer institution which maintains payment accounts for customers.

In a step 210, the application system receives a code from the account server, the code being associated with authenticating the contactless payment transaction. The type of code received from the account server is dependent on the type of key (e.g., a symmetric key or an asymmetric key) used in the authentication process shown in FIG. 1. In an embodiment where the key is a symmetric key and the transaction PIN is randomly generated by the account server, the code is the transaction PIN. In another embodiment where the key is an asymmetric key pair and the transaction PIN is randomly generated by the account server, the code is the transaction PIN in encrypted form (i.e., encrypted using the public key of the asymmetric key pair).

Referring to FIG. 3, a computerised network 300 for performing the method 200 in accordance with an embodiment of the disclosure is shown. The computerised network 300 comprises an account server 304 which maintains a payment account associated with the customer from which payment can be made. The account server 304 may be a server associated with an electronic wallet service provider or it may be associated with a payment network, such as the Banknet payment network operated by Mastercard®. As shown in FIG. 3, the account server 304 is in communication with a customer electronic device 302 and an issuer server 306. The issuer server 306 is associated with an issuer institution which maintains payment accounts associated with customers for performing payment transactions. The customer electronic device 302 may be a mobile phone, a smartphone, a tablet, a personal digital assistant (PDA), a key fob, a transponder device, a NFC-enabled device, or a computer. The customer electronic device 302, together with its operating system (e.g. an Android™ operating system) and the application system installed in the customer electronic device 302, may be configured to perform the operations as discussed in the methods 100 and 200 above. In addition, the computerised network 300 comprises a local database 303 in communication with the customer electronic device 302. The local database 303 may be a hardware component of the customer electronic device 302 such that data can be transferred to and from the local database 303 and be processed at the customer electronic device 302 offline. In an embodiment, encrypted transaction PINs for authenticating payment transactions offline are stored in the local database 303.

In an embodiment, the customer initiates registration of the customer electronic device 302 and the application system for authenticating contactless payment transactions. The application system is associated with a customer account which may be used to fund the contactless payment transactions. The customer account may be an electronic wallet or any other payment account which can provide funds. The application system may check if the customer electronic device 302 is eligible for authenticating contactless payment transactions offline. For example, the application system checks (i) if the operating system of the customer electronic device 302 supports authentication operations, (ii) if a trusted execution environment (TEE) is present in the customer electronic device 302 and/or (iii) if a customer identifier is already enrolled or registered with the customer electronic device 302. For example, if the customer identifier is a fingerprint, the application system verifies if a fingerprint sensor operationally connected to the customer electronic device 302 is available and checks that there is at least one fingerprint registered with the customer electronic device 302. In this case, the fingerprint may be enrolled with a fingerprint manager of the operating system and stored locally in the customer electronic device 302. Once the eligibility of the customer electronic device 302 is checked, the customer may be prompted to opt-in to authenticate contactless payment transactions offline using the application system. The application system is then configured to work with an Android Keystore™ to generate a key (e.g., a symmetric key or an asymmetric key pair). A unique crypto object may also be derived using the key which serves to recall the key from the Keystore™. When making a payment, the crypto object is returned by the fingerprint manager after successful authentication of the fingerprint. The crypto object contains a handle (i.e., an address or identifier) for the key such that the key can be retrieved from the Keystore™ and used in encrypting or decrypting data (e.g., the cypher) from the Android Keystore™ so as to protect the integrity of the fingerprint authentication and to prevent a third party from intercepting the results. The application system is configured to prompt the customer for authentication or to prompt the operating system to authenticate the customer. Once the customer is authenticated, the application system notifies the account server 304 that the customer has registered to be authenticated locally for contactless payment transactions. The application system may notify the account server 304 that the customer electronic device 302 is TEE enabled. Upon receiving a notification that the customer has registered to be authenticated locally for contactless payment transactions, the account server 304 is configured to transmit a code to the customer electronic device 302. The code may be a transaction PIN, a transaction PIN in encrypted form or a salted transaction PIN. A salted transaction PIN is a transaction PIN which is added with a salt. A salt is typically some random data that is unique to each customer which is added as an input to a hash function to generate a salted code (i.e., a salted transaction PIN) that is unique so as to improve security and prevent cyber-attacks. In embodiments, where the key is a symmetric key and the code is a transaction PIN or a salted transaction PIN, the code (i.e., the transaction PIN or the salted transaction PIN) is encrypted using a cipher, by the operating system as instructed by the application system, derived from the symmetric key and stored as a transaction PIN in encrypted form locally in the database. The account server 304 may also be configured to notify the issuer server 306 that the customer has registered to authenticate contactless payment transactions locally using the customer electronic device 302.

Although only one customer electronic device 302 is shown in FIG. 3, a plurality of customer electronic devices 302 may form part of the computerised network 300. Similarly, a plurality of issuer servers 306 may be in communication with the account server 304 and form part of the computerised network 300. There is provided an account server database 308 in communication with the account server 304. The account server database 308 serves at least to store information associated with the customer account and the customer electronic device 302 for use in authenticating contactless payment transactions offline. Moreover, an issuer database 310 is operationally connected to the issuer server 306. In embodiments where the issuer server 306 is notified that the customer and/or customer electronic device 302 has registered to authenticate contactless payment transactions locally using the customer electronic device 302, the issuer database 310 serves at least to store information pertaining to the registration, for example, an indicator to note that the customer account maintained at the issuer server 306 can be authenticated offline. Communication between the servers and databases may take place via any type of network, for example, a virtual private network (VPN), the Internet, a local area and/or wide area network (LAN and/or WAN), and so on.

Figure 4:
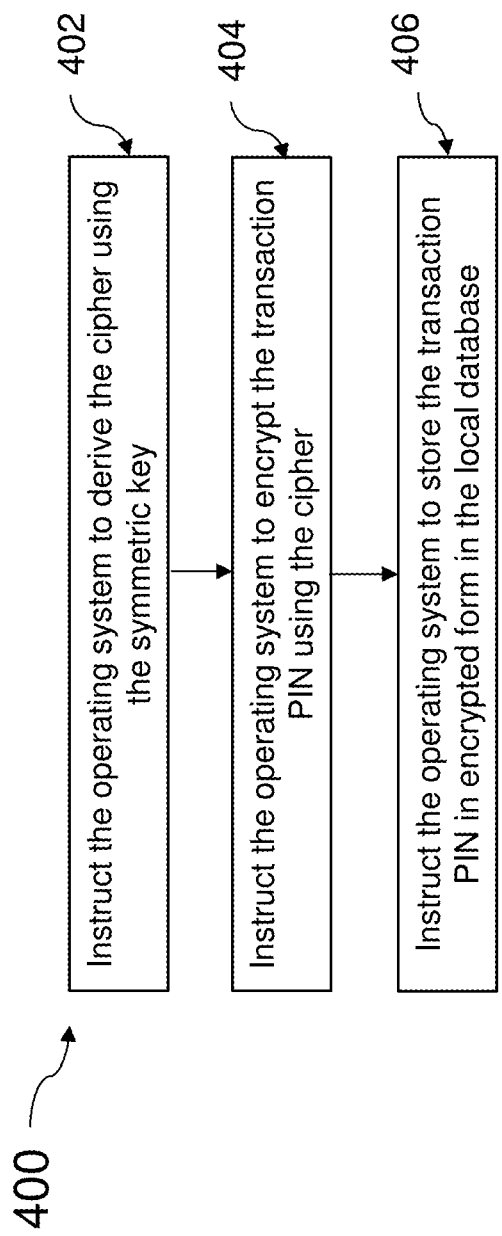
FIG. 4 shows steps of a method for authenticating a payment card transaction where the key is a symmetric key in accordance with an embodiment of the disclosure.

FIG. 4 shows steps of a method for authenticating a payment card transaction where the key is a symmetric key in accordance with an embodiment of the disclosure. The method 400 provides further detail to the method 200 when the customer and the application system registers to authenticate contactless payment transactions locally using the customer electronic device 302 with a symmetric key.

In a step 402, where the key generated in the operating system (e.g., as instructed by the application system) is a symmetric key, the application system instructs the operating system to derive a cipher using the symmetric key.

In a step 404, where the code received from the account server 304 in the step 210 is a transaction PIN, the application system is configured to instruct the operating system to encrypt the transaction PIN received from the account server 304 using the cipher derived in the step 402. In this case, the transaction PIN may be generated randomly by the account server 304. In embodiments where the transaction PIN is determined by the customer (the customer may determine the transaction PIN and transmit it to the account server 304 during the registration process as illustrated in the method 200), the code received from the account server 304 is a salted transaction PIN. In this case, the application system is configured to instruct the operating system to encrypt the salted transaction PIN using the cipher derived in the step 402, in the step 404.

In a step 406, the application system is configured to instruct the operating system to store the transaction PIN in encrypted form (e.g., an encrypted transaction PIN or an encrypted salted PIN) in the local database 303 of the customer electronic device 302.

Figure 5:
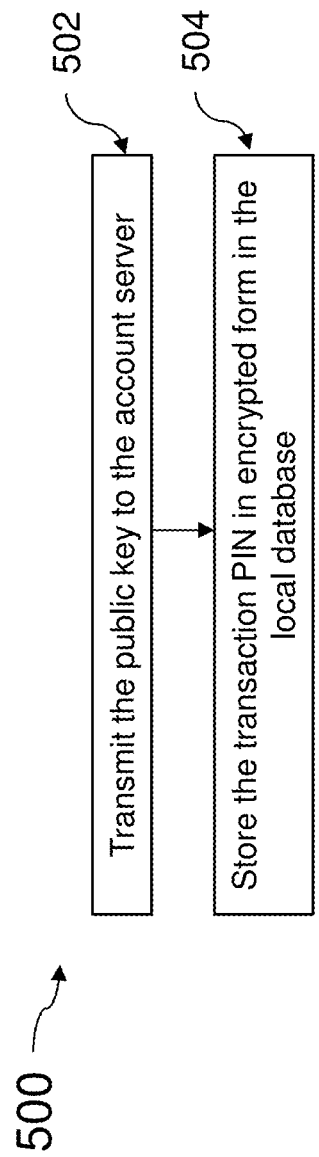
FIG. 5 shows steps of a method for authenticating a payment card transaction where the key is an asymmetric key pair in accordance with an embodiment of the disclosure.

FIG. 5 shows steps of a method 500 for authenticating a payment card transaction where the key is an asymmetric key pair in accordance with an embodiment of the disclosure. The method 500 provides further detail to the method 200 when the customer has registered to authenticate contactless payment transactions locally using the customer electronic device 302 with the asymmetric key pair.

In a step 502, where the key generated in the operating system (e.g., as instructed by the application system) is the asymmetric key pair, the application system is configured to transmit a public key of the asymmetric key pair to the account server 304. The account server 304 is configured to use the public key to encrypt the transaction PIN before sending the transaction PIN in encrypted form as a code in the step 210. The transaction PIN may be generated randomly by the account server 304.

After the application system receives the code (i.e., the transaction PIN in encrypted form), the transaction PIN in encrypted form (i.e., the encrypted transaction PIN using the private key) is stored in the local database 303 of the customer electronic device 302 in a step 504.

Figure 6:
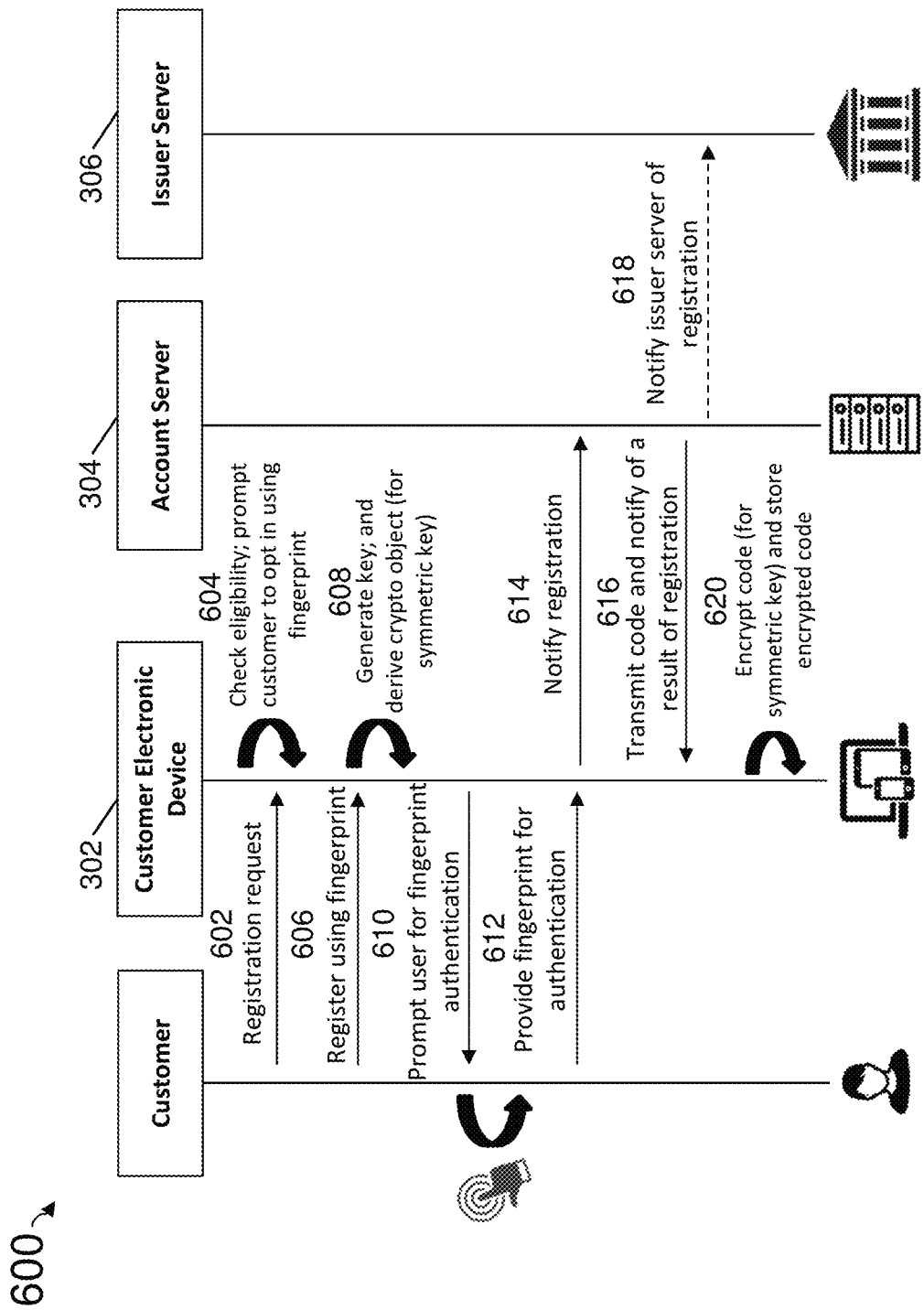
FIG. 6 shows steps of a method for registering the system for use in authenticating payment card transactions in accordance with an embodiment of the disclosure.

FIG. 6 shows steps of a method 600 for registering the customer and the application for use in authenticating payment card transactions in accordance with some embodiments of the disclosure. In an embodiment, the customer electronic device 302 comprises the operating system and the application system. Here, for simplicity in illustrating the process of registration between the different entities within the computerised network 300, the processes carried out by the application system, the operating system and/or components of the customer electronic device 302 are taken to be processed at the customer electronic device 302 in the figure. Details of the different processes carried out by the application system, the operating system and the components of the customer electronic device 302 are illustrated in FIG. 9a below. In this example, a fingerprint is used in authenticating the customer for carrying out certain operations/processes with the application system installed in the customer electronic device 302.

In a step 602, the customer initiates registration of the customer and the application system for authenticating contactless payment transactions. The application system is associated with a customer account which may be used to fund payment transactions. The customer account may be an electronic wallet or any other payment account which can provide funds for carrying out contactless payment transactions.

Once prompted by the registration request, the application system is configured to check if the customer electronic device 302 is eligible for authenticating contactless payment transactions offline in a step 604. For example, the application system verifies (i) if the operating system of the customer electronic device 302 supports authentication operations, (ii) if a trusted execution environment (TEE) is present in the customer electronic device 302 and/or (iii) if a customer identifier (in this case, a fingerprint) is already enrolled or registered with the customer electronic device 302. The application system may verify if a fingerprint sensor is operationally connected to the customer electronic device 302 and checks that there is at least one fingerprint associated with the customer which is registered with the customer and stored locally in the customer electronic device 302. The fingerprint may be enrolled in a fingerprint manager (e.g. a part of the operating system) installed in the customer electronic device 302 which is associated with the application system. Once the eligibility of the device 302 is verified, the customer may be prompted to opt-in to authenticate contactless payment transactions offline using the application system with the registered fingerprint.

In a step 606, the customer selects to register for authenticating contactless payment transactions offline.

In a step 608, the application system is configured to work with an Android Keystore™ (also part of the operating system) to generate a key (e.g., a symmetric key or an asymmetric key pair). If the key is a symmetric key, a crypto object may be derived using the symmetric key. If the key is an asymmetric key pair, a crypto object may be derived using a private key of the asymmetric key pair. The crypto object serves to recall the key from the Keystore™ once the customer is authenticated. In an embodiment, the customer is required to authenticate for each cryptography action. For example, each contactless payment transaction requires an authentication from the customer before each contactless payment transaction can proceed.

The application system is configured to prompt the customer for authentication using the registered fingerprint in a step 610. In an embodiment, the customer is prompted through a customised screen within the application system. The application system may be associated with either a fingerprint manager or a confirm credentials application programme interface (API) to authenticate the customer. The customer provides his/her fingerprint for authentication in a step 612. Once the customer is authenticated and if the key is a symmetric key, the application system is configured to instruct the operating system to generate a cipher derived from the symmetric key. In any case, the application system, via the customer electronic device 302, is configured to notify the account server 304 that the customer and/or the application system has registered to be authenticated locally for contactless payment transactions in a step 614. In the step 614, the application system may notify the account server 304 that the device 302 is TEE enabled. If the key is an asymmetric key pair where the asymmetric key pair comprises a private key and a public key, the App may transmit the public key to the account server in the step 614.

Upon receiving a notification that the customer and/or the customer electronic device 302 has registered to be authenticated locally for contactless payment transactions in the step 614, the account server 304 is configured to transmit a code to the customer electronic device 302 in a step 616. The code may be received at the application system. The code may be a transaction PIN or a salted transaction PIN if the key is a symmetric key, or a transaction PIN in encrypted form if the key is an asymmetric key pair. For some embodiments where the key is a symmetric key, the transaction PIN may be determined by the customer or generated randomly by the account server 304. In the case where the transaction PIN is determined by the customer, the code received from the account server 304 may be a salted transaction PIN. In the case where the transaction PIN is generated randomly by the account server 304, the code received from the account server 304 may be a transaction PIN. For some embodiments where the key is an asymmetric key pair, the account server 304 is configured to encrypt the transaction PIN using the public key provided in the step 614 before transmitting the transaction PIN in encrypted form as the code to the customer electronic device 302 in the step 616. In this case, the transaction PIN may be generated randomly by the account server 304. The account server 304 may also be configured to notify the issuer server 306 that the customer has registered to authenticate contactless payment transactions locally using the customer electronic device 302 in a step 618 depending on a requirement of the issuer institution associated with the issuer server 306.

In a step 620, where the code is the transaction PIN or the salted transaction PIN (for cases where the key is symmetric), the code (i.e., the transaction PIN or the salted transaction PIN) is encrypted using the cipher by the operating system (e.g., as instructed by the application system) and stored as a transaction PIN in encrypted form locally in the database of the customer electronic device 302.

Figure 7:
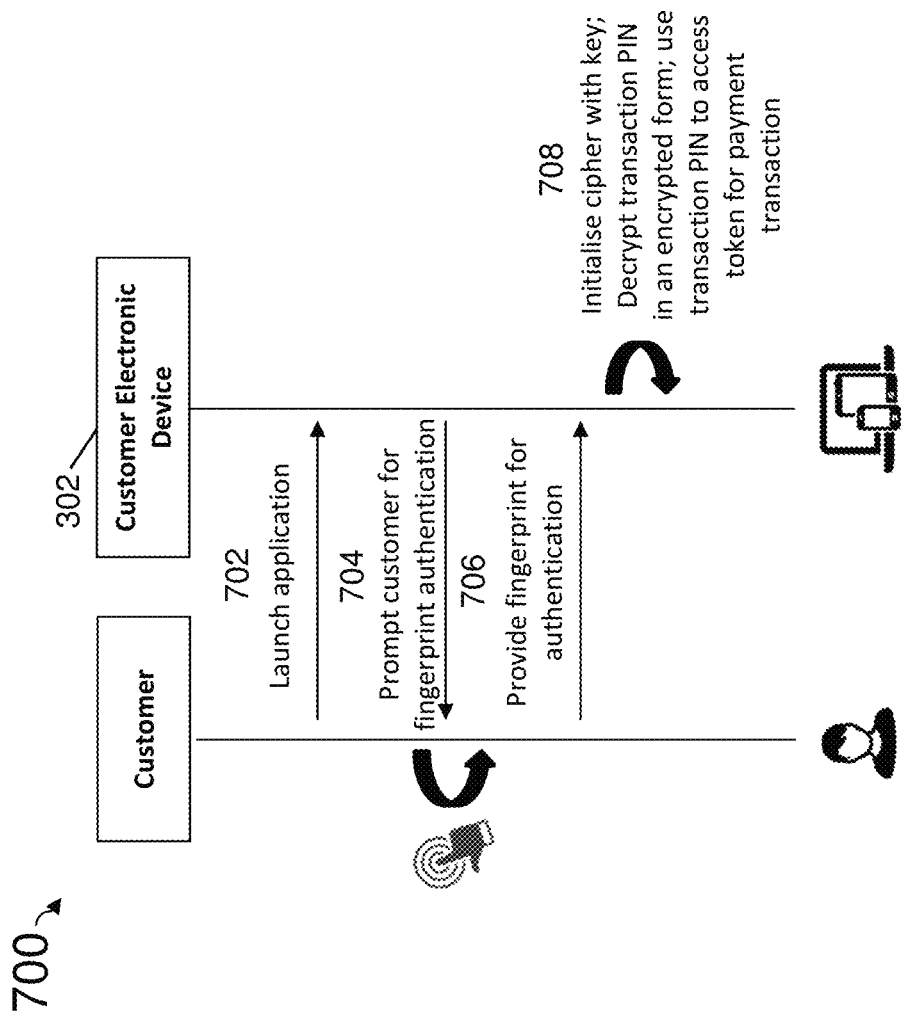
FIG. 7 shows steps of a method for authenticating a contactless payment transaction in accordance with an embodiment of the disclosure.

FIG. 7 shows steps of a method 700 for authenticating a contactless payment transaction in accordance with some embodiments of the disclosure. Similar to FIG. 6, for simplicity in illustrating the process of authenticating a contactless payment transaction between the different entities within the computerised network 300, the processes carried out by the application system, the operating system and/or components of the customer electronic device 302 are taken to be processed at the customer electronic device 302 in the figure. Details of the different processes carried out by the application system, the operating system and the components of the customer electronic device 302 are illustrated in FIG. 9b below.

In a step 702, the customer launches the application system in the customer electronic device 302. The customer may initialise the application system in anticipation of making payment for a contactless payment transaction carried out in a store, for example, via a point-of-sale (POS) terminal.

In a step 704, the application system in the customer electronic device 302 prompts the customer for an input of his/her fingerprint for authentication. The application system may prompt the operating system to receive the input of the customer fingerprint for authentication.

In a step 706, the customer provides his/her fingerprint as an input to the customer electronic device 302 for authentication. Once the customer electronic device 302 receives the input of the customer's fingerprint, the operating system of the customer electronic device 302 is configured to determine if the customer's fingerprint matches the one enrolled in the application system when the customer registered to authenticate contactless payment transactions using the application system offline in the method 600 discussed above.

Once the customer is authenticated, the customer electronic device 302 together with its operating system is configured to initialise a cipher with the key, in step 708. If the key is a symmetric key, the cipher is initialised using the symmetric key generated. Alternatively, if the key is an asymmetric key pair, the cipher is initialised using the private key of the asymmetric key pair. In other embodiments, initialising a cipher includes generating a cipher in the customer electronic device 302 which may or may not utilise a key. In various embodiments, depending on if the key is a symmetric key or an asymmetric key pair, the crypto object derived from either the symmetric key or the private key of the asymmetric key pair in the step 608 is generated once the customer is authenticated. The generated crypto object is used to recall its corresponding symmetric key or the private key of the asymmetric key pair for initialising the cipher.

In any case, once the cipher is initialised, the operating system of the customer electronic device 302 is configured to use the cipher to decrypt a transaction personal identification number (PIN) which is stored in the local database 303 in an encrypted form. The transaction PIN may be encrypted by the cipher for the case of the symmetric key, or it may be encrypted by the public key of the asymmetric key pair in the case where the key is the asymmetric key pair.

The transaction PIN, once decrypted, is received by the application system and can be used by the application system to access a token, where the token is associated with payment details for processing the contactless payment transaction. The token may be stored in the local database 303 of the customer electronic device 302. The token may then be used for further processing of the contactless payment transaction in a conventional method, as known by a skilled person in the art. For example, the token is transmitted to a payment network where the payment details in the token are accessed for further processing of the payment transaction.

FIG. 8, comprising FIGS. 8a and 8b, shows a non-exhaustive list of responses for authenticating contactless payment transactions. In particular, examples of the Application Programming Interface (API) response, response code used, behaviour of the application system (App) and customer experience, are listed for different scenarios when a device with an Android™ operating system is employed.

The first row in FIG. 8a shows the corresponding processes carried out at the customer electronic device 302 together with the App once the customer has been successfully authenticated using his/her fingerprint. Once the authentication is successful, no response code is generated and the application can be accessed. The App will therefore continue to launch for normal operation and will allow known single tap, double tap or in-App check-out to proceed with a payment transaction. In the background of the App, the fingerprint manager is configured to retrieve/generate the crypto object where the key can be accessed so as to retrieve the cipher for decrypting the transaction PIN, as described in the method 100 in FIG. 1. The App may also show a response on screen (e.g., "Fingerprint recognised") to notify the customer that his/her fingerprint has been authenticated.

The second row in FIG. 8a shows different scenarios and their corresponding processes carried out at the customer electronic device 302 together with the App if there exists certain issues experienced by the fingerprint manager when the fingerprint is being acquired. In an example, the fingerprint acquired may be of a good quality but the App may not be able to process it due to some errors that occurred during processing by the App. In this case, the App may return a failure message (e.g., "Fingerprint not recognised. Try again.") to notify the customer to retry inputting his/her fingerprint for authentication. Another five possible scenarios relating to errors experienced during the fingerprint acquiring process have also been listed in the second row. For instance, (i) the fingerprint image acquired may be too noisy due to suspected or detected dirt on the fingerprint sensor of the customer electronic device 302 (e.g., in the case of a response code "FINGERPRINT_ACQUIRED_IMAGE_DIRTY"); (ii) the fingerprint image may be too noisy to process due to a detected condition and the fingerprint image acquired is deemed insufficient (e.g., in the case of "FINGERPRINT_ACQUIRED_INSUFFICIENT"); (iii) there may only be a partial fingerprint image detected (e.g., in the case of a response code "FINGERPRINT_ACQUIRED_PARTIAL"); (iv) the fingerprint image was incomplete due to quick motion of the finger when the fingerprint is being acquired (e.g., in the case of a response code "FINGERPRINT_ACQUIRED_TOO_FAST"); (v) the fingerprint image was unreadable due to a lack of motion (e.g., in the case of a response code "FINGERPRINT_ACQUIRED_TOO_SLOW"). For all these 5 possible scenarios, the App may return a failure message (e.g., "Fingerprint not recognised. Try again.") to notify the customer to retry inputting his/her fingerprint for authentication.

FIG. 8b shows other examples which lead to a failure for fingerprint authentication. In a first row of FIG. 8b, different scenarios are listed and their corresponding processes carried out at the customer electronic device 302 together with the App if there exists certain issues experienced by the fingerprint manager during fingerprint authentication (e.g., failure to receive a fingerprint). Six possible scenarios which have been listed are (i) the authentication operation was cancelled because the fingerprint sensor of the customer electronic device 302 is unavailable (e.g., in the case of a response code "FINGERPRINT_ERROR_CANCELLED"); (ii) the hardware is unavailable (e.g., in the case of a response code "FINGERPRINT_ERROR_HW_UNAVAILABLE"); (iii) the authentication process was cancelled because the API is locked out as a result of too many attempts (e.g., in the case of "FINGERPRINT_ERROR_LOCKOUT"); (iv) in the case of enrolment of a fingerprint, the process cannot be completed because there is not enough storage space remaining to complete the enrolment process (e.g., in the case of "FINGERPRINT_ERROR_NO_SPACE"); (v) the authentication process has been running for too long without receiving an input of a fingerprint (e.g., in the case of a response code "FINGERPRINT_ERROR_TIMEOUT"); (vi) the fingerprint sensor of the customer electronic device was unable to process the fingerprint image (e.g., in the case of a response code "FINGERPRINT_ERROR_UNABLE_TO_PROCESS").

Scenario (i) may occur when the customer presses a "power" key of the customer electronic device 302 (i.e., the system) and turns off the screen of the customer electronic device 302, or another application comes onto the foreground and requests to use the fingerprint sensor. No action is required on the part of the customer when this error occurs. Scenario (ii) and (iii) may cause the Android™ App to opt-out from fingerprint based authentication from the Android™ platform and clear all the keys and encrypted data in the Android™ device and fall back to use of a standard PIN. For the scenarios (iv) to (vi), the App may return a failure message (e.g., "Fingerprint not recognised. Try again.") to notify the customer to retry inputting his/her fingerprint for authentication.

The second row of FIG. 8b shows the corresponding processes carried out at the customer electronic device 302 together with the App if the customer is not authenticated and no response code is generated. In this case, the App may return a failure message (e.g., "Fingerprint not recognised. Try again.") to notify the customer to retry inputting his/her fingerprint for authentication.

FIG. 9, comprising FIGS. 9a and 9b, shows schematically a functional structure 900 of the customer electronic device 302 (e.g., comprising the application system and the operating system), where FIG. 9a shows a process flow between different modules in the customer electronic device 302 during a registration process while FIG. 9b shows a process flow between different modules in the customer electronic device 302 during an authentication process for a payment transaction, in accordance with various embodiments of the disclosure. In order to simplify FIGS. 9a and 9b, only functional modules involved in the registration process and the authentication process respectively are shown, although it should be noted that the functional modules shown in FIGS. 9a and 9b may all be comprised in the customer electronic device 302 at the same time.

FIG. 9a shows the process flow between different modules in the customer electronic device 302 during a registration process in accordance with various embodiments of the disclosure. The customer electronic device 302 comprises the application system (App) 902 and the operating system 904. The App 902 comprises a verification module 906, a registration module 908 and a communication module 912. The operating system 904 comprises an authentication module 914, a cryptography module 916. The customer electronic device 302 also comprises I/O (input/output devices) 918, a local database 920, a device communication module 922 and a trusted execution environment (TEE) 924.

The interactions of the different modules within the customer electronic device 302 are illustrated in the following steps.

In step 1, a registration request is received at the registration module 908 of the App from the customer via the I/O device 918. The I/O device 918 may comprise a touchscreen and/or a keyboard (virtual or physical) via which the customer may send a registration request to the registration module 908 of the App.

In a step 2, the registration request is passed from the registration module 908 to the verification module 906 within the App.

In a step 3, the verification module 906 prompts the authentication module 914 of the operating system 904 to request for an authentication from the customer.

In a step 4, the authentication module 914 requests the customer to input a customer identifier via the I/O device 918 of the customer electronic device 302. The customer identifier may be one of the following: a biometric, a fingerprint, a facial recognition, an iris recognition, a voice recognition, a gesture, or a password. For example, the customer may be prompted via a display of the customer electronic device 302 to input the customer identifier.

In a step 5, the customer may input a customer identifier input via the I/O device 918 and received at the authentication module 914. For example, the customer may input his/her fingerprint (FP) via a fingerprint sensor of the customer electronic device 302.

Once the FP input is received at the authentication module 914, the authentication module 914 is configured to authenticate the customer in a conventional manner. This may comprise comparing the FP input received with a registered FP in the local database 920 and determining if the FP input matches the registered FP in the local database 920. The customer may be authenticated if the FP input matches the registered FP. If the FP input does not match, the authentication module 914 may be configured to notify the customer that authentication is unsuccessful and request the customer to re-enter the FP input (see FIGS. 8a and 8b for more examples).

Once the customer has been authenticated, a result of the authentication is sent to the verification module 906 in a step 6. The verification module 906 then notifies the registration module 908 that the customer has been authenticated in a step 7.

The registration module 908 is configured to instruct the cryptography module 916 to generate a key in a step 8. The key generated may be a symmetric key or an asymmetric key pair. The asymmetric key pair comprises a public key and a private key. The cryptography module 916 is configured to store the generated key in the TEE 924 in a step 9.

The registration module 908 may concurrently send a result of registration to the communication module 912 in a step 10 while it instructs the cryptography module 916 to generate the key. In some embodiments, the step 8 and the step 10 may happen one after the other in any combination. In any case, the result of the registration is received at the communication module 912. The communication module 912 is configured to at least transmit a result of a registration request to the account server 304 via the device communication module 922 in a step 11, and to receive a code from the account server 304 via the device communication module 922 for use in authenticating contactless payment transactions offline in a step 12. If the key generated in the step 8 is an asymmetric key pair, the public key may be comprised in the result of the registration request when it is transmitted to the account server 304 in the step 11. In this case, the account server 304 is configured to encrypt the transaction PIN using the public key received from the customer electronic device 302 in the step 11 and transmit an encrypted PIN as the code back to the customer electronic device 302 in the step 12. If the key is a symmetric key, the code received may be a transaction PIN or a salted transaction PIN. For some embodiments where the key is a symmetric key, the transaction PIN may be determined by the customer or generated randomly by the account server 304. In the case where the transaction PIN is determined by the customer, the code received from the account server 304 may be a salted transaction PIN. In the case where the transaction PIN is generated randomly by the account server 304, the code received from the account server 304 may be a transaction PIN. The code received at the communication module 912 at the step 12 may then be passed to the registration module 908.

In some embodiments where the key generated is a symmetric key, the registration module 908 is configured to instruct the cryptography module 916 to encrypt the transaction PIN or the salted transaction PIN in a step 14a. Encryption of the transaction PIN or the salted transaction PIN may be done by the cryptography module 916 deriving a cipher (as instructed by the registration module 908) from the symmetric key and encrypting the transaction PIN or the salted transaction PIN with the cipher. The cryptography module 916 may be configured to store the encrypted transaction PIN/encrypted salted transaction PIN in the local database 920 of the customer electronic device 302 in a step 15a.

In some embodiments where the key generated is an asymmetric key, the registration module 908 is configured to store the encrypted PIN received at the local database 920 of the customer electronic device 302 in a step 14b.

FIG. 9b shows a process flow between different modules in the customer electronic device 302 during an authentication process for a payment transaction in accordance with various embodiments of the present disclosure. In this process flow, the App 902 further comprises an access module 910. The function of the access module 910 is described below.

During authentication of a contactless payment transaction as exemplified by the method 700, the verification module 906 is configured to prompt the customer for a fingerprint (FP) input via the I/O devices 918 in a step (i). In addition, the verification module 906 is configured to prompt the authentication module 914 of the operating system 904 to listen and react to FP authentication in a step (ii). In a step (iii), a FP input is received from the customer via the I/O devices 918 and is received at the authentication module 914. For example, the I/O devices 918 is associated with a fingerprint sensor which can receive a fingerprint from the customer.

In some embodiments where a confirm credential API is used, the verification module 906 may not need to prompt the customer for a customer identifier input. For example, the customer may unlock a screen on the customer electronic device 302 using a customer identifier input to the I/O device 918. For example, the customer identifier input may be received at a touch screen of the customer electronic device 302 as a password or a gesture from the customer. In some embodiments, the customer identifier input may be a facial expression or a pattern of an iris of the customer if facial or iris recognition is captured by a camera of the customer electronic device 302. The customer identifier input may comprise voice recognition which can be captured by a microphone of the customer electronic device 302.

In any of these cases (either by the fingerprint manager or the confirm credential API), once the customer is authenticated, the authentication module 914 may be configured to instruct the cryptography module 916 to initialise the cipher using the symmetric key or the private key of the asymmetric key pair in the step (iv).

Once the cipher has been initialised at the step (iv), the cipher is passed to the verification module 906 in a step (v). The verification module 906 is configured to pass the cipher to the access module 910 in a step (vi).

The access module 910 is configured to instruct the cryptography module 916 to use the cipher to decrypt the transaction PIN, which is presently in an encrypted form, in a step (vii). In some embodiments, the steps (v) to (vii) may not be required. In this case, once the customer is authenticated, the authentication module 914 is configured to notify the cryptography module 916 that the customer is authenticated and instruct the cryptography module 916 to retrieve the cipher which the cryptography module 916 can use to subsequently decrypt the encrypted transaction PIN. In any case, the cryptography module 916 is configured to prompt the local database 920 to provide the encrypted transaction PIN in a step (viii). In a step (ix), the local database 920 retrieves the encrypted transaction PIN and passes it to the cryptography module 916.

The cryptography module 916 is configured to decrypt the transaction PIN and send the transaction PIN, once decrypted, to the access module 910 in a step (x). The access module 910 is configured to use the transaction PIN to access a token stored in the local database 920 in a step (xi). In a step (xii), the local database 920 sends the token to the access module 910 where the token can be used for processing a contactless payment transaction via the device communication module 922 in a step (xiii).

FIG. 10 is a block diagram showing a technical architecture 1000 (i.e., hardware) of a communication device (e.g., the customer electronic device 302). The technical architecture 1000 includes a processor 1002 (which may be referred to as a central processor unit or CPU) that is in communication with memory devices, including secondary storage 1004 (such as disk drives or memory cards), read only memory (ROM) 1006, and random access memory (RAM) 1008. The processor 1002 may be implemented as one or more CPU chips. The technical architecture further comprises input/output (I/O) devices 1010, and network connectivity devices 1012.

The I/O devices 918 comprise a user interface (UI) 918a and a camera 918b. The UI 918a may comprise a screen in the form of a touch screen, a keyboard, a keypad, a graphical user interface (GUI) or other known input device. The camera 918b is a device for recording visual images in the form of photographs, film or video signals. In an embodiment, the UI 918a is configured to display information from the App 902 so as to interact with the customer during registration and/or authentication processes. The UI 918a may also receive inputs, such as a fingerprint, a password and/or gesture from the customer for authentication processes. The camera 918b may also be configured to capture a facial expression or an iris pattern of the customer for authenticating the customer. In addition, the I/O devices 918 may comprise a microphone (not shown) for receiving audio inputs from the customer.

The secondary storage 1004 is typically comprised of a memory card or other storage device and is used for non-volatile storage of data and as an over-flow data storage device if RAM 1008 is not large enough to hold all working data. Secondary storage 1004 and ROM 106 may be used to store programs which are loaded into RAM 1008 when such programs are selected for execution. In this embodiment, the secondary storage 1004 has a processing component 1004a, comprising non-transitory instructions operative by the processor 1002 to perform various operations of the method of the present disclosure. The ROM 1006 is used to store instructions and perhaps data which are read during program execution. In some embodiments, the ROM 1006 may store the operating system 904 (e.g., Android™ operating system, Android Keystore™, Android Fingerprint Manager™, etc.) and the App 902 for use in a contactless payment transaction etc. The ROM 1006 may comprise a trusted execution environment (TEE) 924 where code (e.g., a key for carrying the authentication processes described above) and data loaded inside is protected with respect to their integrity and confidentiality. The token of the present disclosure may also be stored in the TEE 924. The ROM 1006 may furthermore comprise a local database 920 for storing the transaction PIN of the present disclosure, in encrypted form. The secondary storage 1004, the RAM 1008, and/or the ROM 1006 may be referred to in some contexts as computer readable storage media and/or non-transitory computer readable media.

The network connectivity devices 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other network devices. These network connectivity devices 1012 may enable the processor 1002 to communicate with the Internet or one or more intranets. With such a network connection, it is contemplated that the processor 1002 might receive information from the network, or might output information to the network in the course of performing the above-described method operations. Such information, which is often represented as a sequence of instructions to be executed using the processor 1002, may be received from and outputted to the network, for example, in the form of a computer data signal embodied in a carrier wave. The device communication module 922 may comprise the network connectivity devices 1012 so as to enable the customer electronic device 302 at least to communicate with the account server 304 in order to carry out the processes described above.

The processor 1002 executes instructions, codes, computer programs, scripts which it accesses from hard disk, floppy disk, optical disk (these various disk based systems may all be considered secondary storage 1004), flash drive, ROM 1006, RAM 1008, or the network connectivity devices 1012. While only one processor 1002 is shown, multiple processors may be present. Thus, while instructions may be discussed as executed by a processor, the instructions may be executed simultaneously, serially, or otherwise executed by one or multiple processors. In an embodiment, the processor 1002 is configured to execute the App stored in the ROM 1006 and/or RAM 1008 or the secondary storage 1004 for registration and/or authentication processes as described in the exemplary embodiments.

As is understood by a skilled person in the art, various hardware and software components, as described, may work in combination to form the various modules as described in FIG. 9 to perform their respective functions.

FIG. 11 is a block diagram showing a technical architecture 1100 of the account server 304 and/or the issuer server 306.

The technical architecture 1100 includes a processor 1102 (which may be referred to as a central processor unit or CPU) that is in communication with memory devices including secondary storage 1104 (such as disk drives), read only memory (ROM) 1106, and random access memory (RAM) 1108. The processor 1102 may be implemented as one or more CPU chips. The technical architecture may further comprise input/output (I/O) devices 1110, and network connectivity devices 1112.

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs which are loaded into RAM 1108 when such programs are selected for execution.

In this embodiment, the secondary storage 1104 has a processing component 1104*a* comprising non-transitory instructions operative by the processor 1102 to perform various operations of the method of the present disclosure. The ROM 1106 is used to store instructions and perhaps data which are read during program execution. The secondary storage 1104, the RAM 1108, and/or the ROM 1106 may be referred to in some contexts as computer readable storage media and/or non-transitory computer readable media.

I/O devices 1110 may include printers, video monitors, liquid crystal displays (LCDs), plasma displays, touch screen displays, keyboards, keypads, switches, dials, mice, track balls, voice recognizers, card readers, paper tape readers, or other input and/or output devices.

The network connectivity devices 1112 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other network devices. These network connectivity devices 1112 may enable the processor 1102 to communicate with the Internet or one or more intranets. With such a network connection, it is contemplated that the processor 1102 might receive information from the network, or might output information to the network in the course of performing the above-described method operations. Such information, which is often represented as a sequence of instructions to be executed using processor 1102, may be received from and outputted to the network, for example, in the form of a computer data signal embodied in a carrier wave.

The processor 1102 executes instructions, codes, computer programs, scripts which it accesses from hard disk, floppy disk, optical disk (these various disk based systems may all be considered secondary storage 1104), flash drive, ROM 1106, RAM 1108, or the network connectivity devices 1112. While only one processor 1102 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 1102, the RAM 1108, and the ROM 1106 are changed, transforming the technical architecture, in part, into a specific purpose machine or system having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made within the scope of the present disclosure as defined by the claims. Moreover, features of one or more embodiments may be mixed and matched with features of one or more other embodiments.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A customer electronic device for authenticating a customer in connection with an offline contactless payment transaction, the customer electronic device comprising:
    a biometric sensor;
    an operating system including an authentication module and a cryptography module;
    a mobile application installed at the customer electronic device, the mobile application including a verification module and an access module, the verification module and the access module in communication with the cryptography module of the operating system; and
    a local database accessible by the operating system and the mobile application, the local database including a transaction personal identification number (PIN) in an encrypted form and a registered customer identifier input;
    wherein the customer electronic device is configured, during an offline contactless payment transaction between the customer electronic device and a merchant terminal, wherein the merchant terminal is offline, to:
        receive, by the authentication module of the operating system, from the biometric sensor, a customer identifier input, the customer identifier input including a biometric of a customer associated with the customer electronic device, the biometric including at least one of: a fingerprint, a facial recognition, an iris recognition, a voice recognition, and a gesture;
        authenticate, by the operating system, the customer based on a comparison of the received customer identifier input and the registered customer identifier input in the local database;
        in response to a successful authentication of the customer, derive, by the cryptography module of the operating system, a cipher from a key generated by the operating system and provide the cipher to the verification module;
        receive, by the verification module of the mobile application, the cipher from the cryptography module of the operating system;
        in response to receiving the cipher at the verification module, provide, by the access module of the mobile application, to the cryptography module of the operating system, an instruction to decrypt the transaction PIN;
        in response to the instruction provided by the access module of the mobile application, retrieve, by the cryptography module of the operating system, the transaction PIN from the local database, initialize, by the cryptography module of the operating system, the cipher in the customer electronic device using the key generated by the operating system, and decrypt, by the cryptography module of the operating system, the transaction PIN based on the initialized cipher;
        receive, by the access module of the mobile application, from the cryptography module of the operating system, the transaction PIN once decrypted;
        access, by the access module of the mobile application, a payment token stored in the local database based on the transaction PIN, the payment token associated with payment account details for processing the offline contactless payment transaction to a payment account of the customer; and
        transmit the payment token to a payment network, wherein the payment token is indicative of an offline authentication of the customer, within the customer electronic device and independent of the merchant terminal, thereby enabling processing of the offline contactless payment transaction.

2. The customer electronic device of claim 1, wherein the mobile application further includes a registration module and a communication module;
    wherein the registration module is configured to:
        receive a registration request from the customer to register the mobile application for use in authenticating the customer in connection with the offline contactless payment transaction; and instruct the operating system to generate the key;
wherein the verification module is further configured to instruct the operating system to authenticate the customer to verify the registration request; and
wherein the communication module is configured to:
transmit a result of the registration request to an account server associated with the payment account used in the offline contactless payment transaction; and
receive the transaction PIN from the account server, the transaction PIN associated with authenticating the customer in connection with the offline contactless payment transaction.

3. The customer electronic device of claim 2, wherein the key is a symmetric key; and
wherein, in response to an instruction from the registration module, the operating system is further configured to:
derive the cipher using the symmetric key;
encrypt the transaction PIN using the cipher; and
store the transaction PIN in encrypted form in the local database.

4. The customer electronic device of claim 2, wherein the key is an asymmetric key pair and the asymmetric key pair comprises a private key and a public key;
wherein the communication module is further configured to transmit the public key to the account server for use by the account server to encrypt the transaction PIN, wherein the transaction PIN received from the account server is in encrypted form; and
wherein the registration module is further configured to store the transaction PIN in encrypted form in the local database.

5. The customer electronic device of claim 1, wherein the verification module is further configured to:
prompt the customer for the customer identifier input for authentication when the mobile application is initialized; and
prompt the operating system to receive the customer identifier input from the customer.

6. The customer electronic device of claim 1, wherein the verification module is further configured to instruct the operating system to prompt the customer for the customer identifier input for authentication.

7. A computer-implemented method for authenticating a customer in connection with an offline contactless payment transaction between a customer electronic device and an offline merchant terminal, the method comprising:
receiving, by an authentication module of an operating system of the customer electronic device, from a biometric sensor of the customer electronic device, a biometric of a customer associated with the customer electronic device, the biometric including at least one of: a fingerprint, a facial recognition, an iris recognition, a voice recognition, and a gesture;
authenticating, by the operating system, the customer based on a comparison of the received biometric and a reference biometric stored in a local database of the customer electronic device;
in response to a successful authentication of the customer, deriving, by a cryptography module of the operating system, a cipher from a key generated by the operating system and providing the cipher to a verification module of a mobile application implemented on the customer electronic device;
receiving, by the verification module of the mobile application, the cipher from the operating system;
in response to receiving the cipher at the verification module, providing, by an access module of the mobile application, an instruction to the cryptography module of the operating system to decrypt a transaction personal identification number (PIN) using the cipher, the transaction PIN stored in the local database of the customer electronic device in an encrypted form;
retrieving, by the cryptography module of the operating system, the transaction PIN from the local database, initializing, by the cryptography module of the operating system, the cipher with the key, and decrypting, by the cryptography module of the operating system, the transaction PIN based on the initialized cipher;
receiving, by the access module of the mobile application, from the cryptography module of the operating system, the transaction PIN as retrieved and decrypted by the cryptography module of the operating system;
accessing, by the access module of the mobile application, a payment token stored in the local database based on the transaction PIN, the payment token associated with payment account details for processing the offline contactless payment transaction to a payment account; and
transmitting the payment token to a payment network, wherein the payment token is indicative of an offline authentication of the customer, within the customer electronic device and independent of the merchant terminal, thereby enabling processing of the offline contactless payment transaction.

8. The method of claim 7 further comprising:
receiving a registration request from the customer to register the mobile application for use in authenticating the customer in connection with the offline contactless payment transaction;
instructing the operating system to generate the key;
instructing the operating system to authenticate the customer to verify the registration request;
transmitting a result of the registration request to an account server associated with the payment account used in the offline contactless payment transaction; and
receiving the transaction PIN from the account server, the transaction PIN associated with authenticating the customer in connection with the offline contactless payment transaction.

9. The method of claim 8, wherein the key is a symmetric key; and
wherein the method further comprises:
deriving, by the operating system, the cipher using the symmetric key;
encrypting, by the operating system, the transaction PIN using the cipher; and
storing, by the operating system, the transaction PIN in encrypted form in the local database.

10. The method of claim 8, wherein the key is an asymmetric key pair and the asymmetric key pair comprises a private key and a public key; and
wherein the method further comprises:
transmitting the public key to the account server for use by the account server to encrypt the transaction PIN, wherein the transaction PIN received from the account server is the transaction PIN in encrypted form; and
storing the transaction PIN in encrypted form in the local database.

11. The method of claim 9, further comprising salting the transaction PIN by the account server if the transaction PIN is determined by the customer.

12. The method of claim 9, wherein the transaction PIN is randomly generated by the account server.

13. The method of claim 8, wherein the key is stored in a trusted execution environment (TEE) of the operating system.

14. The method of claim 7, further comprising:
prompting, by the mobile application, the customer for the biometric for authentication when the mobile application is initialized; and
prompting the operating system to receive, from the biometric sensor, the biometric from the customer.

15. The method of claim 7, further comprising instructing the operating system to prompt the customer for the biometric for authentication.

* * * * *